(12) United States Patent
Wildhagen et al.

(10) Patent No.: US 7,515,921 B2
(45) Date of Patent: Apr. 7, 2009

(54) PEAK REDUCTION FOR SIMULCAST BROADCAST SIGNALS

(75) Inventors: Jens Wildhagen, Weinstadt (DE); Dietmar Schill, Winnenden (DE)

(73) Assignee: Sony Deutschland GmbH, Cologne (DE)

( * ) Notice: Subject to any disclaimer, the term of this patent is extended or adjusted under 35 U.S.C. 154(b) by 1006 days.

(21) Appl. No.: 10/434,800

(22) Filed: May 9, 2003

(65) Prior Publication Data
US 2004/0037305 A1   Feb. 26, 2004

(51) Int. Cl.
*H04B 15/00* (2006.01)
(52) U.S. Cl. ........................ 455/503; 455/3.06; 375/295
(58) Field of Classification Search ................ 455/522, 455/503, 3.06; 375/295; 370/432, 390
See application file for complete search history.

(56) References Cited

U.S. PATENT DOCUMENTS 6,005,894 A * 12/1999 Kumar ....................... 375/270
6,256,302 B1   7/2001 Siegle et al.

FOREIGN PATENT DOCUMENTS

| EP | 1 276 257 | 8/2001 |
|----|-----------|--------|
| EP | 1 276 257 | 1/2003 |
| WO | WO 95/22816 | * 8/1995 |

* cited by examiner

*Primary Examiner*—Duc Nguyen
*Assistant Examiner*—Angelica M Perez
(74) *Attorney, Agent, or Firm*—Oblon, Spivak, McClelland, Maier & Neustadt, P.C.

(57) ABSTRACT

A reduced peak simulcast signal generator and a method for generating a stable peak-attenuated simulcast signal, which combines a digital broadcast signal and an analogue broadcast signal, are described. The simulcast signal generator comprises at least one attenuation stage for attenuating the digital and/or the analogue broadcast signal in order to obtain a stable simulcast signal. Each attenuation stage comprises a simulcast signal generator for generating an error signal, and attenuation means which attenuate, in dependence of said first error signal, at least one of the analogue and the digital broadcast signal.

14 Claims, 3 Drawing Sheets

PEAK REDUCTION FOR SIMULCAST BROADCAST SIGNALS

The present invention is related to a reduced peak simulcast signal generator, to a method for generating a peak-attenuated simulcast signal, and to a simulcast broadcast signal.

DRM (Digital Radio Mondial) is a digital service in the broadcasting bands below 30 MHz. A simultaneous transmission of the conventional analogue and the new digital service will simplify and accelerate the introduction of the DRM system, since listeners of the analogue service are not lost during the introduction of DRM.

In the European Patent Application EP-A-01118908.1, "DRM/AM Simulcast", the simulcast transmission signal and simulcast signal generators are described in detail. The complete disclosure of said application, which has been filed by the applicant of the present application, is herewith incorporated into this specification by reference.

When a digital DRM signal and an analogue audio signal are transmitted simultaneously, via one channel in the simulcast mode described in EP-A-01 118 908.1, the system will become instable in case the AM peak amplitude or the DRM peak amplitude exceeds a certain value. Because of this behaviour, the signal power of the analogue signal and the DRM signal must be small compared to the carrier. As a result, the signal power of the AM signal and the DRM signal is relatively small.

It is therefore an object of the invention to provide a simulcast signal generator, a method for generating a simulcast signal and a simulcast broadcast signal which permit to increase the signal power of the analogue and digital signal in order to increase the coverage area of the analogue and the digital system.

The object of the invention is solved by a reduced peak simulcast signal generator according to claim 1, by a method for generating a peak-attenuated simulcast signal according to claim 9, and by a simulcast broadcast signal according to claim 17. Preferred embodiments thereof are respectively defined in the respective following subclaims. A computer program product according to the present invention is defined in claim 20.

According to the invention, a reduced peak simulcast signal generator for a digital broadcast signal and an analogue broadcast signal, comprising an initial attenuation stage, is provided. The reduced peak simulcast signal generator comprises a final simulcast signal generator, which generates a final simulcast signal for transmission. Furthermore, said initial attenuation stage comprises a first simulcast signal generator, which generates, starting from said broadcast signals, a first error signal, and first attenuation means, which attenuate, in dependence of said first error signal, at least one of said broadcast signals in order to generate first attenuated signals, based on which said final simulcast signal is generated.

Usually, the peak amplitude is decreased using a limiter. This limiter leads to a broad spectrum and is therefore not suited for the generation of a simulcast transmission signal.

The invention allows to generate a stable simulcast signal with a maximum signal strength of the underlying analogue and digital transmission signals. The amount of attenuation is chosen in dependence of the error signal, which is a measure of the signal stability of the simulcast signal. Just as much attenuation as necessary is applied to the underlying signals.

In order to attenuate the analogue and/or the digital broadcast signal, smooth weighting functions are used, and thus, spectral distortions can be avoided. The simulcast signal is only attenuated when it is indispensable in order to perform the sideband modulation of the analogue and the digital transmission signal. Most of the time, the signal amplitude is not affected.

According to a preferred embodiment of the invention, said first attenuation stage comprises delay elements for delaying said broadcast signals by respective time delays that compensate the processing time caused by said first simulcast signal generator and said first attenuation means. When the processing time spent by the first simulcast signal generator and the first attenuation means is exactly compensated, further signal attenuations will be exactly in phase with former signal attenuations. Thus, the degree of peak reduction can be exactly tailored to the needs of the respective transmission situation. Distortions caused by phase shifts are avoided.

According to a preferred embodiment of the invention, said reduced peak simulcast signal generator further comprises M additional attenuation stages, with each additional attenuation stage comprising: a second simulcast signal generator, which generates, starting from preceding attenuated signals, a second error signal, second attenuation means, which attenuate, in dependence of said second error signal, at least one of said preceding attenuated signals in order to generate second, further attenuated signals, based on which said final simulcast signal is generated. Thereby M is a positive integer including zero and is determined according to the desired stability of the final simulcast signal and/or according to the degree of attenuation of each attenuation stage. By means of the additional attenuation stages, the required amount of signal attenuation for obtaining a stable simulcast signal can be found with a cascade of different available attenuations. If a certain attenuation is not sufficient, the corresponding error signal will indicate that the simulcast signal is not stable, and the attenuation can be increased by activating additional attenuation stages. An iterative strategy is important for obtaining the optimum simulcast signal. When a stable simulcast signal is achieved, one can be sure to have the highest possible signal strength within said simulcast signal. The resulting advantage is that the coverage area of the analogue and the digital system is increased.

Preferably, said additional attenuation stages comprise delay elements for delaying the preceding attenuated signals by respective time delays that compensate the processing time caused by said second simulcast signal generator and said second attenuation means. Thus, all the signals in the simulcast signal generator remain in phase, and distortions are avoided. Furthermore, different attenuations caused by different attenuation stages can be superimposed in a well-defined manner.

Preferably, said peak reduction stages comprise multipliers for multiplying at least one of said broadcast signals or said preceding attenuated signals with a weighting signal. A multiplication with weighting signals enables a straightforward accumulation of different weighting procedures. Using a smooth weighting signal does not lead to spectral distortions.

Preferably, said digital broadcast signal is a DRM signal. Further preferably, said analogue broadcast signal is an amplitude modulated audio broadcast signal. At this moment, the technical transition from conventional AM technology to digital standards such as DRM is taking place. For this reason, a modulation technique that is capable of supporting both standards simultaneously is highly appreciated.

Preferably, said first and second simulcast signal generator respectively comprise a first modulator to modulate a digital signal to one sideband of a carrier of the transmission channel, a second modulator to modulate a correcting signal to the other sideband of the carrier of the transmission channel, whereby said correcting signal is determined such that the envelope demodulation of the transmission channel represents the simulcast signal generator's analogue input signal, and a first adder for adding said both sidebands.

The inventive method generates a peak-attenuated simulcast signal starting from a digital broadcast signal and an analogue broadcast signal. The method comprises a first step of generating a first error signal, by means of a first simulcast signal generator, from said broadcast signals. The next step is to determine if said first error signal exceeds a predefined threshold, and in case said first error signal is too large, to attenuate at least one of said analogue and said digital broadcast signals in order to generate first attenuated signals. Last, a final simulcast signal for transmission is generated based on said first attenuated signals.

Preferably, a simulcast broadcast signal combining a digital signal and an analogue signal in one transmission channel can be generated by the method described above.

The invention does not have to be implemented in hardware. The invention can also be realised as a computer program product which carries out the method steps as described above when said computer program product is executed on a computer, digital signal processor or the like.

Further objects and features of the present invention will become apparent from the following description of an exemplary embodiment thereof taken in conjunction with the accompanying figures, wherein FIG. 1 shows a block diagram of a peak-attenuated simulcast signal generator comprising (M+1) attenuation stages;

Figure 1:
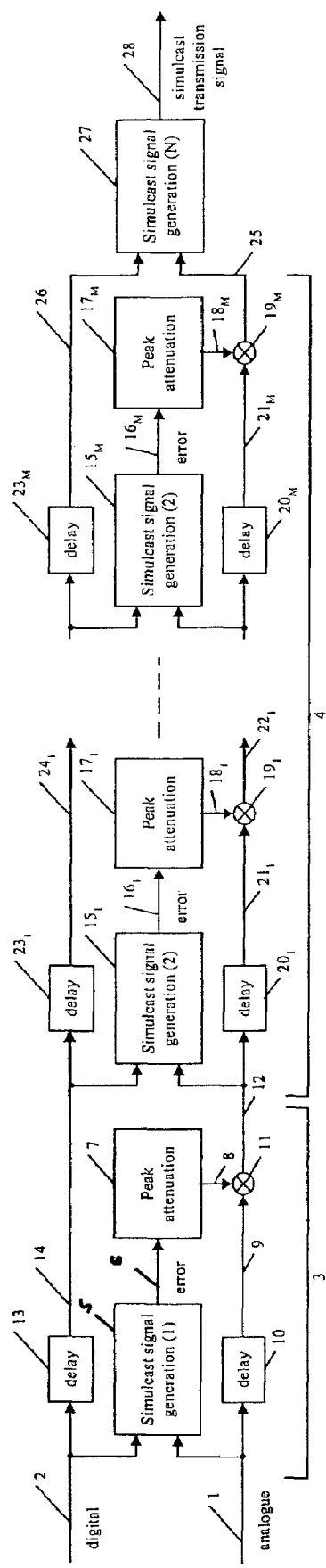

In FIG. 1, a block diagram of the simulcast signal generation unit according to the invention is shown. In order to avoid that large AM peak amplitudes or large DRM peak amplitudes cause an instable simulcast broadcast signal, the analogue broadcast signal 1 and the digital broadcast signal 2 may be attenuated as much as necessary to obtain a stable signal. For this purpose, an iterative procedure is suggested, and therefore, several attenuation stages, an initial attenuation stage 3 and additional attenuation stages 4, are provided.

The initial attenuation stage 3 comprises a simulcast signal generator 5 and a peak attenuation unit 7. Both the analogue broadcast signal 1 and the digital broadcast signal 2 are connected to the simulcast signal generator 5. The simulcast signal generator 5 transforms the analogue and the digital broadcast signal 1, 2 into a simulcast signal. The digital broadcast signal 2 modulates the upper sideband of the simulcast signal, whereby the lower sideband is modulated according to a correcting signal. The error that occurs when the simulcast signal is generated is indicated by an error signal 6. Especially in case of large signal amplitudes, the simulcast signal is not stable any more. In this case the error signal 6 assumes a large value.

According to the invention, the simulcast signal is stabilized by attenuating the analogue and/or the digital broadcast signal 1, 2. The error signal 6 is forwarded to the peak attenuation unit 7. The degree of attenuation is chosen according to the magnitude of the error signal 6. Alternatively, a constant attenuation degree can be chosen independent from the magnitude of the error signal. In case the error signal 6 has a small magnitude, there will be no attenuation at all. In case of a large error signal 6, either the analogue broadcast signal 1 or the digital broadcast signal 2 (or both) is attenuated. The error signal 6 is compared with a predetermined threshold, and in case the error signal 6 exceeds said threshold, at least one of the analogue and the digital broadcast signal 1, 2 have to be attenuated. In the solution shown in FIG. 1, only the analogue broadcast signal 1 is attenuated; the digital broadcast signal 2 is not attenuated at all. The attenuation of the analogue signal usually leads to sufficient results. In case of high peak amplitude of the DRM signal, the peak amplitude of the DRM signal can be attenuated in the same way as it has been described for the analogue signal.

The peak attenuation unit 7 generates a weighting signal 8, which is forwarded to the multiplier 11. The delayed analogue signal 9, which has been delayed by the delay element 10, is forwarded to the multiplier 11 as well. At the multiplier 11, the delayed analogue signal 9 is multiplied with the weighting signal 8, and as a result, the attenuated analogue signal 12 is obtained.

Figure 2:
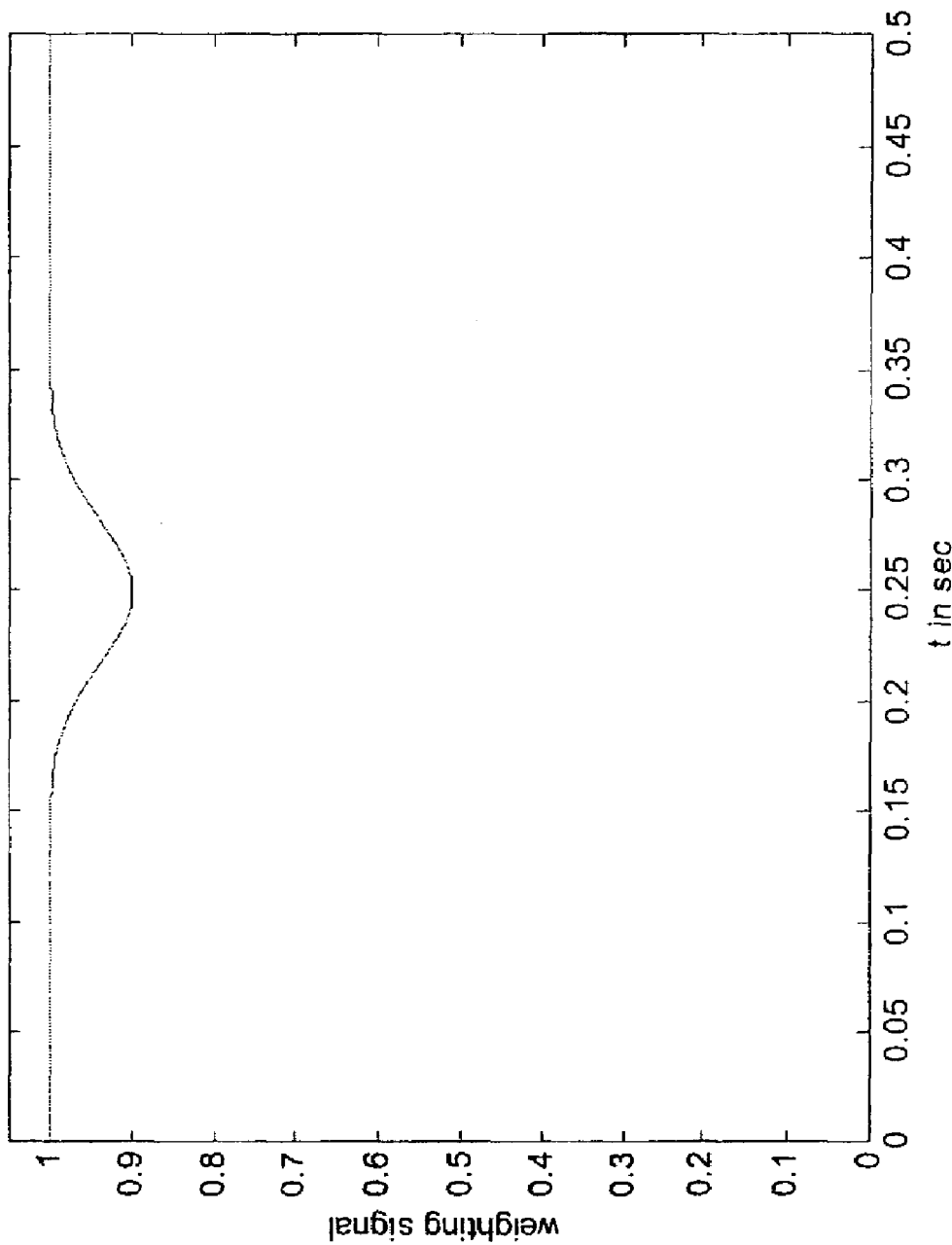
FIG. 2 depicts the weighting signal, which is used for attenuating the analogue broadcast signal, as a function of time.

The weighting signal 8 is depicted in FIG. 2. Usually, the weighting signal has the amplitude 1. At the time t=0.25 sec, the peak attenuation circuit has detected that the error signal exceeds a certain threshold. The weighting signal reduces the gain from 1 to 0.9 at the time 0,25 sec. So the peak amplitude of the audio signal that caused the distortions in the AM demodulated simulcast signal is attenuated, and the attenuated signal is then used for a new attempt to obtain a stable simulcast signal.

Within the simulcast signal generator 5 and the peak attenuation unit 7, some processing time is spent for evaluating the error signal 6 and for providing the weighting signal 8. Therefore, both the analogue broadcast signal 1 and the digital broadcast signal 2 are delayed in order to compensate this time delay. The delay element 10 converts the analogue broadcast signal 1 into the delayed analogue signal 9, and the delay element 13 converts the digital broadcast signal 2 into the delayed digital signal 14.

Next, the attenuated analogue signal 12 and the delayed digital signal 14 are forwarded to the M additional attenuation stages 4, whereby M is a positive integer including zero. Both the attenuated analogue signal 12 and the delayed digital signal 14 are input to the simulcast signal generator 15$_1$, which is part of the first additional attenuation stage. Starting from this set of attenuated signal 12 and 14, the simulcast signal generator generates a simulcast signal and the corresponding error signal 16$_1$, whereby the error signal indicates whether it has been possible to integrate the analogue signal 12 and the digital signal 14 into one simulcast signal. The error signal 16$_1$ is forwarded to the peak attenuation unit 17$_1$ of the first additional attenuation stage, and said peak attenuation unit 17$_1$ provides the weighting signal 18$_1$ to the multiplier 19$_1$. The attenuated analogue signal 12 is connected to the delay element 20$_1$, in order to obtain the delayed signal 21$_1$. The delayed signal is connected to the multiplier 19$_1$, which multiplies said delayed signal 21$_1$ with the weighting function 18$_1$. The degree of attenuation is chosen according to the magnitude of the error signal 16$_1$, or a fixed degree of attenuation is chosen. As a result of the multiplication, the further attenuated analogue signal 22$_1$ is obtained, which is forwarded to the next attenuation stage.

The delayed digital signal 14 is also forwarded to a delay element 23$_1$, and thus, the delayed digital signal 24$_1$ is obtained. The further attenuated analogue signal 22$_1$ and the delayed digital signal 24$_1$ are passed on to the next attenuation stage, and the iterative attenuation procedure is continued.

At the last attenuation stage (which is the M$^{th}$ additional attenuation stage), an attenuated analogue signal 25 and a delayed digital signal 26 are generated. Those two signals 25, 26 are forwarded to the final simulcast signal generator 27, and said final simulcast generator 27 determines the final simulcast transmission signal 28.

Figure 3:
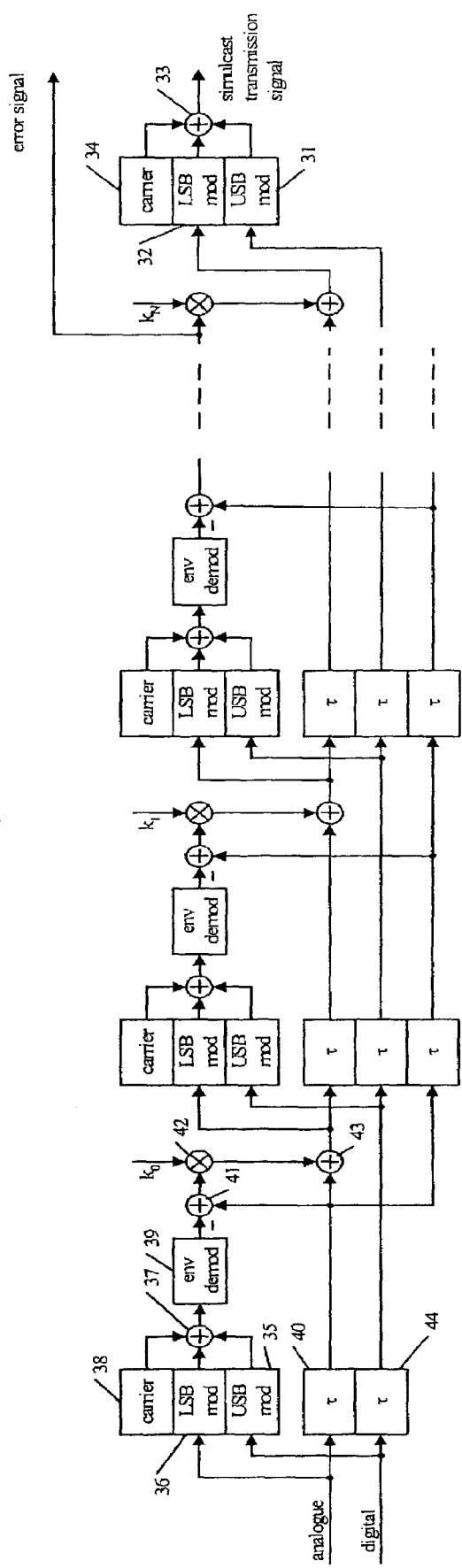
FIG. 3 shows a block diagram of a single simulcast signal generator comprising N correction signal units.
Figure 4:
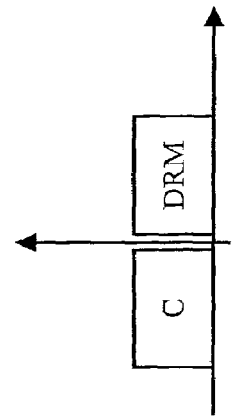
FIG. 4 shows the modulation of the lower sideband and the upper sideband for a simulcast broadcast signal.

In FIG. 3, a block diagram of an exemplary simulcast signal generator is shown. A technical implementation of a simulcast signal generator can be found in the above-referenced European Patent Application EP-A-01118908.1, "DRM/AM Simulcast". The simulcast signal generators 5 and 15₁ to 15$_M$ can be implemented as shown in FIG. 3. The simulcast signal is generated by a first modulator 31 that modulates the digital transmission signal to one sideband of a carrier of the transmission channel, here the upper sideband USB, and a second modulator 32 that modulates the correcting signal C to the other sideband of the carrier of the transmission channel, here to the lower sideband LSB. The resulting signal is depicted in FIG. 4, in which the two different sidebands are shown.

In order to generate the simulcast signal, the first adder 33 adds said both sidebands and possibly the carrier signal at the centre of both sidebands, whereby the carrier signal is generated by a carrier signal generator 34.

The digital transmission signal supplied to the first modulator 1 corresponds to the correcting signal C in time, i.e. is delayed during the generation of the correcting signal C to match therewith.

The simulcast signal generator shown in FIG. 3 further comprises a correcting signal generator that—in this case—also delays the digital signal. The correcting signal generator comprises a third modulator 35 to modulate said digital transmission signal to said one sideband, i.e. here to the upper sideband, a fourth modulator 36 to modulate the analogue transmission signal to the other sideband, here the lower sideband, a second adder 37 to add said both sidebands and the carrier signal which is generated by a second carrier signal generator 38 at the centre of said both sidebands. Further, the correcting signal generator comprises a first envelope demodulator 39 to envelope demodulate the so generated simulcast signal, a first delay element 40 to delay the analogue transmission signal according to the processing time to generate a demodulated respective simulcast signal, a first subtractor 41 to generate an error signal by subtracting the envelope demodulated simulcast signal from the delayed analogue transmission signal, a first multiplier 42 to weight the error signal with a time-variant or time-invariant variable, a third adder 43 to generate the correcting signal C or an intermediate correcting signal by adding the weighted error signal to the delayed analogue transmission signal, and a second delay element 44 to delay the digital transmission signal according to the processing time needed to generate and demodulate the respective simulcast signal.

As stated before, these elements of the correcting signal generator which can be regarded as one correcting signal unit either generate the correcting signal or an intermediate correcting signal. The correcting signal generated by this one correcting signal unit is normally only a rough estimation and would not necessarily lead to a proper transmission to the analogue transmission signal. However, the quality thereof might also be regarded as sufficient. In case this should not be sufficient, the resulting signal supplied from the third adder 43 might be processed in the same way as the analogue transmission signal was processed before by N similar following correcting signal unit(s). In this case also the digital transmission signal will get accordingly delayed. Such a repetition of the processing might be performed N times, i.e. by N similar following correcting signal unit(s), wherein N is a positive integer including zero and is determined according to the wanted accuracy of the correcting signal which is determined after the $N^{th}$ correcting signal unit.

The invention claimed is:

1. A reduced peak AM simulcast signal generator combining a digital broadcast signal and an analog broadcast signal in one transmission channel, comprising:

an initial attenuation stage including
a first simulcast signal generator configured to modulate the digital broadcast signal to one sideband of a carrier of the transmission channel, to modulate a correcting signal, which is distinct from the analog broadcast signal, to the other sideband of the carrier of the transmission channel, wherein said correcting signal is determined so that the envelope demodulation of the transmission channel represents the analog broadcast signal, and further configured to generate, based on said transmission channel, a first error signal; and
first attenuation means for attenuating, in dependence of said first error signal, at least one of said broadcast signals in order to generate first attenuated signals; and
a final simulcast signal generator configured to generate a final simulcast signal for transmission.

2. The reduced peak simulcast signal generator according to claim 1, wherein said initial attenuation stage comprises delay elements for delaying said broadcast signals by respective time delays that compensate the processing time caused by said first simulcast signal generator and said first attenuation means.

3. The reduced peak simulcast signal generator according to claim 1, further comprising M additional attenuation stages, wherein each additional attenuation stage includes
a second simulcast signal generator configured to generate, starting from preceding attenuated signals, a second error signal; and
second attenuation means for attenuating, in dependence of said second error signal, at least one of said preceding attenuated signals in order to generate second, further attenuated signals, based on which said final simulcast signal is generated,
wherein M is a positive integer and is determined according to a desired stability of the final simulcast signal and/or a degree of attenuation of each attenuation stage.

4. The reduced peak simulcast signal generator according to claim 3, wherein said additional attenuation stages comprise delay elements for delaying the preceding attenuated signals by respective time delays that compensate the processing time caused by said second simulcast signal generator and said second attenuation means.

5. The reduced peak simulcast signal generator according to claim 1, further comprising multipliers configured to multiply at least one of said broadcast signals or said preceding attenuated signals with a weighting signal.

6. The reduced peak simulcast signal generator according to claim 1, wherein said digital broadcast signal is a DRM signal.

7. The reduced peak simulcast signal generator according to claim 1, wherein said analog broadcast signal is a amplitude modulated audio broadcast signal.

8. A method for generating a peak-attenuated AM simulcast signal combining a digital broadcast signal and an analog broadcast signal in one transmission channel, comprising:
modulating the digital broadcast signal to one sideband of a carrier of the transmission channel;
modulating a correcting signal, which is distinct from the analog broadcast signal, to the other sideband of the carrier of the transmission channel, wherein said correcting signal is determined so that the envelope demodulation of the transmission channel represents the analog broadcast signal;

generating a first error signal based on said transmission channel;

when said first error signal exceeds a predefined threshold, attenuating at least one of said analog and said digital broadcast signals in order to generate first attenuated signals; and generating a final AM simulcast signal for transmission based on said first attenuated signals.

9. The method according to claim 8, further comprising delaying said broadcast signals by respective time delays that compensate the processing time caused by said first simulcast signal generator and subsequent processing units.

10. The method according to claim 8, further comprising:

starting from said first attenuated signals, generating a second error signal by means of a second simulcast generator; and attenuating, in dependence of said second error signal, at least one of said preceding attenuated signals, in order to generate second, further attenuated signals, based on which said final AM simulcast signal is generated, wherein the method is repeated M times, wherein M is a positive integer and is determined according to the desired stability of the final simulcast signal and/or a degree of attenuation of each attenuation stage.

11. The method according to claim 8, further comprising delaying the preceding attenuated signals by respective time delays that compensate the processing time caused by said second simulcast signal generator and subsequent processing units.

12. The method according to claim 8, further comprising multiplying at least one of said broadcast signals or said preceding attenuated signals with a weighting signal.

13. The method according to claim 8, wherein said digital broadcast signal is a DRM signal.

14. The method according to claim 8, wherein said analog broadcast signal is a amplitude modulated audio broadcast signal.

* * * * *

UNITED STATES PATENT AND TRADEMARK OFFICE
CERTIFICATE OF CORRECTION

PATENT NO. : 7,515,921 B2  Page 1 of 1
APPLICATION NO. : 10/434800
DATED : April 7, 2009
INVENTOR(S) : Wildhagen et al.

It is certified that error appears in the above-identified patent and that said Letters Patent is hereby corrected as shown below:

On the title page, the Terminal Disclaimer information has been omitted. Item (45) and the Notice information should read as follows:

--(45) Date of Patent: Apr. 7, 2009

( * ) Notice:   Subject to any disclaimer, the term of this patent is extended or adjusted under 35 U.S.C. 154(b) by 1006 days.

This patent is subject to a terminal disclaimer--

On the title page, Item (30) The Foreign Application Priority Data has been omitted. Insert:

--(30)   Foreign Application Priority Data

May 13, 2002  (EP) ..................................02 010 672.0--

Signed and Sealed this

Ninth Day of June, 2009

JOHN DOLL
*Acting Director of the United States Patent and Trademark Office*